United States Patent [19]

Greenlee et al.

[11] Patent Number: 4,937,291
[45] Date of Patent: Jun. 26, 1990

[54] THERMOPLASTIC ELASTOMER BLENDS OF A POLYVINYL CHLORIDE-ACRYLATE COPOLYMER AND A CROSSLINKED NITRILE ELASTOMER

[75] Inventors: William S. Greenlee; Josef C. Vyvoda, both of Avon Lake, Ohio

[73] Assignee: The B.F. Goodrich Company, Akron, Ohio

[21] Appl. No.: 242,391

[22] Filed: Sep. 9, 1988

[51] Int. Cl.$^5$ .................... C08L 33/14; C08L 33/18; C08L 35/06
[52] U.S. Cl. .................... 525/230; 525/212; 525/213; 525/217; 525/219
[58] Field of Search ............... 525/230, 212, 213, 217, 525/219

[56] References Cited

U.S. PATENT DOCUMENTS

| | | | |
|---|---|---|---|
| 2,653,884 | 9/1953 | Hussey et al. | 525/230 |
| 3,595,819 | 7/1971 | Dahli et al. | 525/228 |
| 4,657,976 | 4/1987 | Ott et al. | 525/230 |

Primary Examiner—Jacob Ziegler
Attorney, Agent, or Firm—Daniel J. Hudak; Joe A. Powell

[57] ABSTRACT

Thermoplastic elastomer blends containing polyvinyl chloride having improved oil resistance and low compression set are made by blending a crosslinked nitrile rubber with a polyvinyl chloride-acrylate copolymer. The amount of nitrile rubber can vary over a wide range as from about 1 part to about 400 parts by weight for every 100 parts by weight of the polyvinyl chloride-acrylate copolymer. The polyvinyl chloride-acrylate copolymer has an inherent viscosity of from about 0.3 to about 4.0 and is made from a vinyl chloride monomer with an optional vinyl component comonomer and one or more acrylate monomers having the formula

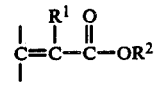

wherein $R^1$ is an aliphatic, an aromatic, or combinations thereof, having from 1 to 18 carbon atoms, or a halogen derivative thereof, or hydrogen, and $R^2$ is an aliphatic, an aromatic, an alkyl hydroxyl, or combinations thereof, having from 1 to 18 carbon atoms, or a halogen derivative thereof; or a hydrocarbyl ether such as an akloxyalkyl, a phenoxyaryl, a henoxyalkyl, or combinations thereof, having from 2 to 1,000 carbon atoms, or a substituted halogen, oxygen, sulfur, or nitrogen derivative thereof.

14 Claims, No Drawings

THERMOPLASTIC ELASTOMER BLENDS OF A POLYVINYL CHLORIDE-ACRYLATE COPOLYMER AND A CROSSLINKED NITRILE ELASTOMER

FIELD OF THE INVENTION

The present invention relates to thermoplastic elastomer blends of a polyvinyl chloride-acrylate copolymer and a crosslinked nitrile rubber. Such blends exhibit good oil resistance, low compression set, and excellent extrusion properties when processed on an elastomeric extruder, i.e., an extruder designed for processing elastomers.

1. Background

Nitrile rubbers are copolymers of butadiene and acrylonitrile. Such polymers generally have good oil resistance and are extensively used for gasoline hoses, fuel tanks, and the like.

U.S. Pat. No. 4,380,606 to Coran and Patel relates to a thermoplastic composition containing a blend of a neutralized acrylic-olefin copolymer and a polyvinyl chloride.

2. Summary of the Invention

Various conventional nitrile rubbers are blended with a polyvinyl chloride-acrylate copolymer to produce a thermoplastic elastomer having excellent processability on elastomeric processing equipment along with good oil resistance and low compression set. Depending upon the end use application, various amounts of crosslinked nitrile rubber are utilized, for example larger amounts yield better oil resistance. A wide range of nitrile rubbers can be utilized such as those made from a conjugated diene having from 4 to 12 carbon atoms, for example butadiene, isoprene, etc., with an acrylonitrile type monomer. The amount of the acrylonitrile type monomer is generally low, for example from about 10 to about 50 percent by weight based upon the total weight of the conjugated diene monomers and the acrylonitrile type monomers forming the nitrile copolymer. Crosslinking is effected utilizing any conventional crosslinking agent such as divinylbenzene. The polyvinyl chloride-acrylate copolymer is made from a vinyl constituent and one or more acrylate comonomers. The vinyl constituent is a vinyl chloride monomer with an optional vinyl component comonomer such as vinyl acetate, styrene or a styrene derivative, a diolefin, a monoolefin, and the like.

DETAILED DESCRIPTION OF THE INVENTION

The thermoplastic elastomer blends of the present invention contain polyvinyl chloride generally in the form of a copolymer. The copolymer is a polyvinyl chloride-acrylate copolymer made from (a) a vinyl constituent, that is, a vinyl chloride monomer and an optional vinyl component comonomer and (b) one or more acrylate monomers. The amount of vinyl chloride monomer and optional vinyl component comonomer utilized to make the polyvinyl chloride-acrylate copolymer is a sufficient amount so that the polyvinyl chloride-acrylate copolymer generally contains from about 10 parts to about 90 parts by weight, desirably from about 25 parts to about 80 parts by weight and preferably from about 40 parts to about 60 parts by weight of vinyl chloride and optional vinyl component units therein for every 100 parts by weight of the copolymer. Thus, the amount of the acrylate units in the copolymer is generally from about 90 parts to about 10 parts by weight, desirably from about 75 to about 20 parts by weight, and preferably from about 60 to about 40 parts by weight. The amount of the optional vinyl component units is from about 0 to about 45 parts by weight with from about 0 to about 20 parts by weight being preferred. In other words, the vinyl chloride constituent can contain up to 50 percent thereof and preferably up to 22 percent thereof by weight of the vinyl component unit. By the term "vinyl component", it is meant a vinyl unit other than vinyl chloride. Such units are well known to the art and to the literature and are derived from vinyl esters wherein the ester portion contains from 1 to 18 carbon atoms such as vinyl acetate; styrene and styrene derivatives having a total of from 8 to 15 carbon atoms such as alpha-methylstyrene, vinyl toluene, chloromethyl styrene, chlorostyrene; vinyl naphthalene; vinylidene chloride; 1,2-dichloroethylene; diolefins having a total of from 4 to 18 carbon atoms such as butadiene, isoprene, including halogenated diolefins such as chloroprene; monoolefins having a total of from 2 to 18 carbon atoms and preferably 2 to 4 carbon atoms; and the like. Vinyl acetate is a preferred vinyl component comonomer which, upon polymerization, becomes a vinyl component unit.

The one or more acrylate units contained in forming the polyvinyl chloride-acrylate copolymer has the formula, before polymerization,

FORMULA I wherein $R^1$ is an aromatic, an aliphatic (especially an alkyl), or combinations thereof, having from 1 to 18 carbon atoms, or a halogen derivative thereof, desirably is methyl, and preferably is hydrogen. $R^2$ is an aliphatic group, especially an alkyl, an aromatic, an alkyl hydroxyl, or combinations thereof, having from 1 to 18 carbon atoms, desirably from 2 to 10 carbon atoms, and preferably from 2 to 8 carbon atoms, or a halogen derivative thereof; or $R^2$ is a hydrocarbyl ether such as alkoxyalkyl, a phenoxyaryl, or a phenoxyalkyl, or combinations thereof having from 2 to 1,000 carbon atoms, desirably from 2 to 18 carbon atoms, and preferably from 2 to 8 carbon atoms, or a substituted halogen, oxygen, nitrogen, or sulfur derivative thereof. Examples of specific acrylate monomers include ethyl acrylate, propyl acrylate, butyl acrylate, hexyl acrylate, octyl acrylate, 2-ethyl hexyl acrylate, nonyl acrylate, decyl acrylate, phenyl acrylate, nonylphenyl acrylate, ethyl methacrylate, butyl methacrylate, hexyl methacrylate, 2-ethyl hexyl methacrylate, methoxymethyl acrylate, methoxyethyl acrylate, ethoxyethyl acrylate, butoxyethyl acrylate, ethoxypropyl acrylate, 2(2-ethoxyethoxy)ethyl acrylate, and the like. Especially preferred acrylate monomers include butyl acrylate, 2-ethyl hexyl acrylate, ethyl acrylate, and the like. As noted hereinabove, the $R^2$ group can be a hydrocarbyl ether group. That is, it can be an ether, a diether, or a multiple ether of an alkyl, an aryl, or combinations thereof, such as an alkoxyalkyl, a phenoxyaryl, a phenoxyalkyl, and the like, generally having from 2 to 1,000 carbon atoms, desirably from 2 to 18 carbon atoms, and preferably from 2 to 8 carbon atoms, or combinations thereof. Examples of specific alkoxyalkyl acrylates include methoxymethyl acrylate, butoxyethyl acrylate; ethoxypropyl acrylate, methoxyethyl acrylate, ethoxyethyl acrylate, 2(2-ethoxyethoxy)ethylacrylate, and the like. Examples of specific phenoxyalkyl acrylates include 2-phenoxyethylacrylate and 2-phenoxyethylmethacrylate. In addition to the above $R^2$ ether groups, halogen, oxygen, nitrogen, or sulfur derivatives of such hydrocarbyl ether groups can also be utilized. For example $R^2$ can be an alkoxyalkyl containing at least one halogen therein in lieu of a hydrogen atom.

The molecular weight of the polyvinyl chloride-acrylate copolymer is measured in terms of inherent viscosity and is from about 0.3 to about 4.0, desirably from about 0.8 to about 2.0, and preferably from about 1.0 to about 1.5. The inherent viscosity is measured utilizing cyclohexanone as the solvent. The copolymer is dissolved in the solvent at 90° C. for 90 minutes and then measured with a viscometer in a water bath at 30° C.

The polyvinyl chloride-acrylate copolymer can be polymerized from the above-noted monomers in any conventional manner such as emulsion, mass, solution, and the like with suspension being preferred. Generally, polymerization is initiated with a free radical initiator such an alkanoyl, aroyl, alkaroyl, or an aralkanoyl diperoxide, a monohydroperoxide, or an azo compound, a peroxy ester, a percarbonate, or any other suitable free radical-type catalyst. Examples of specific initiators include benzoyl peroxide, lauryl peroxide, diacetyl peroxide, cumene hydroperoxides, methyl ethyl ketone peroxide, diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, t-butyl peroxyneodecanoate, di-normal propyl peroxydicarbonate, azobisisobutyronitrile, alpha, alpha'-azodiisobutyrate, 2,2'-azo-bis-(2,4-dimethyl valeronitrile), and the like. Polymerization can be carried out at suitable temperatures with temperatures of from about 10° to 85° C. being desired and from about 40° to about 65° C. being preferred. The amount of the initiator utilized is generally quite small as from about 0.005 parts by weight to about 1.0 parts by weight and preferably from about 0.01 parts by weight to about 0.1 parts by weight for every 100 parts by weight of the total monomers being copolymerized. The polyvinyl chloride-acrylate copolymer desirably is not crosslinked so that it has good processing properties. However, it is to be understood that it is within the ambit of the present invention to partially crosslink or to crosslink the polyvinyl-acrylate copolymer to provide improved physical properties. Should the polyvinyl chloride-acrylate copolymer be crosslinked, any conventional crosslinking agent can be utilized such as diallyl phthalate, various diacrylates such as butane diol diacrylate, diethylene glycol diacrylate, and the like.

The crosslinked nitrile rubber is blended in amounts varying from about 1 to about 400 parts by weight, desirably from about 20 to about 300 parts by weight, and preferably from about 30 to about 100 parts by weight for every 100 parts by weight of the polyvinyl chloride-acrylate copolymer. The nitrile rubber generally acts as a plasticizing agent. However, unlike conventional plasticizing agents, the nitrile rubber does not bleed out and hence shrinkage of the thermoplastic elastomer blend following emersion in hot oil does not occur. In fact, at times, the thermoplastic elastomer blends of the present invention actually swell following emersion in hot oil. The actual amount of nitrile rubber utilized within the above range often depends upon the desired end results. For example, if good oil resistance is desired, large amounts of nitrile rubber are utilized since oil resistance tends to generally increase linearly with the amount of nitrile rubber utilized. The nitrile rubber is made from one or more acrylonitrile type monomers and one or more conjugated diene monomers and preferably from one diene monomer having from 4 to 12 carbon atoms with 4 or 5 carbon atoms, e.g., butadiene or isoprene, being preferred. The amount of conjugated diene monomer utilized in making the nitrile rubber is generally a majority, as from about 50 percent to about 90 percent by weight, desirably from about 60 percent to about 85 percent by weight, and preferably from about 60 percent to about 75 percent by weight based upon the total amount of diene and acrylonitrile or acrylonitrile derivative monomers utilized to form the nitrile rubber.

The acrylonitrile type monomers utilized in making the nitrile rubber generally have the following formula:

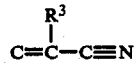

FORMULA II wherein $R^3$ is an aliphatic, especially an alkyl, an aromatic, or combinations thereof, having from 1 to 18 carbon atoms, or preferably is hydrogen. The acrylonitrile type monomer imparts compatibility to the conjugated diene monomers and hence allows it to be blended with the polyvinyl chloride-acrylate copolymer. The acrylonitrile type monomer can be utilized in an amount of from about 10 percent to about 50 percent by weight, desirably from about 15 to about 40 percent by weight, and preferably from about 25 percent to about 40 percent by weight based upon the total weight of the one or more conjugated diene monomers and the one or more acrylonitrile type monomers contained as monomer units in the nitrile rubber.

The various nitrile elastomers can be prepared according to any conventional manner including aqueous emulsion, or dispersion polymerizations, with free radical emulsion polymerization being preferred. Thus, various conventional soaps, emulsifiers or surfactants, known to the art and to the literature, are utilized. Examples of suitable free radical initiators include persulfates, and hydroperoxides such as sodium persulfate, potassium persulfate, ammonium persulfate, cumene hydroperoxide, diisopropylhydroperoxide, and the like. Other examples of free radical initiators are set forth in U.S. Pat. No. 3,487,057, which is hereby fully incorporated by reference. The polymerization temperature is generally from about 5° to about 35° C. with from about 25° to about 35° C. being preferred. Once the polymer has been formed, it can be recovered according to any conventional method such as by coagulation followed by spray drying, and the like.

Various conventional additives in conventional amounts can be utilized in the blends of the present invention. Thus, various heat stabilizers such as barium/cadmium compounds, lead compounds, and organotin compounds, various conventional lubricants generally utilized with polyvinyl chloride polymers such as paraffin, and polyethylene, various processing aids such as polyacrylates, various antioxidants such as BHT, BHA, that is butylated hydroxy toluene and butylated hydroxy anisole, respectively, and various hindered phenols, various UV inhibitors such as substituted benzophenones, and the like, can be utilized. Moreover, plasticizers, such as those typically used to plasticize polyvinyl chloride and known to one skilled in the art, for example, dioctyl phthalate, dioctyl adipate, etc., can also be utilized. Generally, if a plasticizer is utilized, it is utilized in a very small amount since the nitrile elastomer as well as acrylate portion of the polyvinyl chloride-acrylate copolymer act as plasticizing agents.

Various fillers and pigments can also be utilized in conventional amounts such as up to about 200 or 300 parts by weight for every 100 parts by weight of the polyvinyl chloride-acrylate copolymer. Examples of fillers include calcium carbonate, clay, silica, the various silicates, talc, carbon black, and the like. Examples of suitable pigments include titanium dioxide, carbon black, and the like. The various additives, fillers, pigments, and the like are generally added to the mixer with the nitrile elastomer.

Crosslinking of the conjugated diene-acrylonitrile copolymer occurs through the addition of a multifunctional reagent. Any conventional crosslinking agent can be utilized known to the art as well as to the literature such as diacrylates, triacrylates, divinylbenzene, and the like. Such crosslinking agents are known to the art as well as to the literature. An effective amount of crosslinking agent is utilized so as to result in an improved modulus and generally in a significantly improved modulus of the nitrile rubber. Such effective amounts are generally from about 0.1 to about 30 parts by weight and preferably from about 1.0 to about 10 parts by weight for every 100 parts by weight of the dieneacrylonitrile copolymer.

The thermoplastic elastomer blends of the present invention are made or formulated by mixing the crosslinked nitrile elastomer with the polyvinyl chloride-acrylate copolymer under low or high shear conditions. That is, generally some form of shear or mechanical mixing is utilized and thus the blends can be made utilizing shearing apparatus such as a Banbury, a two roll mill, an extruder, and the like. An important aspect of the present invention is that the thermoplastic elastomer blends can be blended as well as subsequently processed utilizing conventional rubber equipment such as mills, a Banbury, extruders designed for processing elastomers, and the like, and alternatively utilizing thermoplastic processing equipment. The blending temperature is generally from about ambient, that is from about 20° C. to about 230° C., desirably from about 35° C. to about 205° C., and preferably from about 120° C. to about 175° C.

The blends of the present invention have been found to have improved physical properties compared to conventional plasticized polyvinyl chloride polymers or copolymers thereof made utilizing a vinyl component comonomer. Such improved properties include low compression set, improved oil resistant properties, improved high temperature deformation resistance, and improved softness, that is, the thermoplastic elastomer blend is soft. As a result, the thermoplastic elastomer blends of the present invention can be utilized wherever such properties are desirable, as in seals and gaskets, hoses, tubing, footwear, sporting goods, weatherstripping, wire and cable jacketing, and the like. Such blends are readily processed on elastomer or thermoplastic processing equipment such as extruders, injection molding apparatus, calenders, thermoforming and compression molding equipment, and the like.

The present invention will be better understood by reference to the following examples.

EXAMPLE 1

Procedure of vinyl chloride monomers/2-ethylhexyl acrylate polymerization.

The polymerization vessel was charged with the following ingredients:

| | |
|---|---|
| Water | 2223 kg. |
| Vinylchloride monomer | 889 kg. |
| 2-ethylhexyl acrylate | 593 kg. |
| Polyvinyl alcohol dispersants | 28.2 kg. |
| Substituted cellulose dispersant | 22.7 kg. |
| Initiator | 0.445 kg. |

The vessel was charged with water and the dispersants first. After evacuation, the mixture of monomers was added and after the mixing of the contents, the temperature was adjusted to 55° C. Lastly, the initiator was added and the reaction started. The polymerization was carried out for 420 minutes after which time the reactor was cooled to room temperature. The polymer was transferred to a stripping vessel to remove unreacted monomers. After the stripping, the polymer was recovered by filtration and dried.

EXAMPLE 2

A PVC/2-ethylhexyl acrylate copolymer was blended with a precrosslinked nitrile/butadiene elastomer in a laboratory Banbury (BR size) mixer. The PVC/2-ethylhexyl acrylate copolymer was prepared as given in Example 1. The precrosslinked nitrile/butadiene elastomer was prepared by copolymerizing acrylonitrile and butadiene in the presence of a difunctional crosslinking agent. The nitrile elastomer contained approximately 33 percent acrylonitrile, 66 percent butadiene and 1 percent crosslinking agent. The mixture was compounded in the Banbury in the presence of various compounding ingredients, such as a stabilizer, a filler, and an antioxidant, and then discharged at a stock temperature of from about 317° to about 335° F. The mixture was then placed on a 6"×16" unheated mill and formed into a sheet. The milled sheet was cut into both 1" wide strips and 6"×6" plaques. The 1" wide strips were extruded on an extruder designed for processing elastomeric materials. The extruder contained an approximately 7:1 length/diameter deepflighted screw and was heated using circulating hot water. The samples were extruded using a Garvey die and surface appearance and rates were recorded The 6"×6" plaques were compression molded using a 2 minute preheat and a 3 minute press at 320° F. and then submitted for physical testing. The results of this testing are given in Table I.

The results in Table I illustrate that blends of a crosslinked nitrile/butadiene elastomer with a PVC/2-ethylhexyl acrylate copolymer will produce products with improved compression set resistance, oil resistance, and reduced high temperature deformation.

TABLE I[1]

| | | | | | |
|---|---|---|---|---|---|
| PVC/2-ethylhexyl acrylate | 100 | 100 | 100 | 100 | 100 |
| Nitrile Elastomer | 0 | 20 | 50 | 100 | 200 |

TABLE I¹-continued

| Banbury Time (min.) | 5.5 | 5 | 4.8 | 4.5 | 4.5 |
|---|---|---|---|---|---|
| Banbury Drop Temp.(°F.) | 320 | 324 | 317 | 324 | 324 |
| Extrusion Stock Temp.(°F.) | 218 | 220 | 220 | 223 | 223 |
| Extrusion rate (g/min.) | 200 | 212 | 176 | 174 | 134 |
| Extrusion Appearance | Small Bumps | Very Small Bumps | Smooth | Smooth | Very Smooth |
| Compression set (100° C./22 hrs.) ASTM D-395 Method B | 66 | 52 | 47 | 53 | 56 |
| Oil Resistance (100° C./166 hrs.) ASTM #3 Oil - % Volume Swell ASTM D-471 | 204 | 137 | 100 | 74 | 52 |
| Hardness - Shore A | 52 | 60 | 55 | 52 | 49 |
| Deformation % - 121° C./1 hr 2,000 g. load | 73 | 53 | 32 | 15 | 13 |

¹Compound also contains Stabilizer 5, Co-stabilizer 3, Filler 8, and Antioxidant 0.5

As apparent from Table I, the addition of the nitrile elastomer resulted in improved compression set, improved oil resistance, as well as, improved resistance to high temperature deformation.

While in accordance with the Patent Statutes, the best mode and preferred embodiment has been set forth, the scope of the invention is not limited thereto, but rather by the scope of the attached claims.

What is claimed is:

1. A polymeric composition, comprising:
a thermoplastic elastomer blend comprising a polyvinyl chloride-acrylate copolymer and a nitrile rubber elastomer, said polyvinyl chloride-acrylate copolymer containing from about 10 parts to about 90 parts by weight of (a) vinyl chloride units and optional vinyl component units wherein the amount of said optional vinyl component units is from about 0 to about 45 parts by weight, and (b) from about 90 parts to about 10 parts by weight of one or more acrylate units, said acrylate unit, before polymerization, having the formula

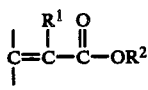

FORMULA I wherein R¹ is selected from the group consisting of aromatic, aliphatic or combinations thereof having from 1 to 18 carbon atoms, halogen derivatives of aromatic, aliphatic, or combinations of aromatic and aliphatic and hydrogen, and wherein R² is selected from the group consisting of aliphatic, aromatic, alkyl hydroxyl or combinations thereof having from 1 to 18 to carbon atoms, halogen derivatives thereof; and hydrocarbyl ether selected from the group consisting of alkoxyalkyl, phenoxyaryl, phenoxyalkyl or combinations thereof having from 2 to 1,000 carbon atoms, and said hydrocarbyl ether substituted with halogen, oxygen, sulfur, and nitrogen; and from about 1 part by weight to about 400 parts by weight of said crosslinked nitrile elastomer for every 100 parts by weight of said polyvinyl chloride-acrylate copolymer, said crosslinked nitrile elastomer made by polymerizing one or more conjugated dienes having from 4 to 12 carbon atoms, and one or more acrylonitrile type monomers having the formula

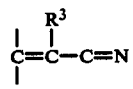

FORMULA II where R³ is selected from the group consisting of aliphatic, aromatic or combinations thereof having from 1 to 18 carbon atoms and hydrogen, wherein the amount of said one or more conjugated diene monomers is from about 50 percent by weight to about 90 percent by weight based upon the total weight of said conjugated diene monomers and said acrylonitrile monomer, and wherein the amount of said acrylonitrile monomer is from about 10 percent to about 50 percent by weight based upon the total weight of said conjugated diene monomers and said acrylonitrile type monomers contained as monomer units in the crosslinked nitrile elastomer.

2. A thermoplastic elastomer blend according to claim 1, wherein the inherent viscosity of said polyvinyl chloride-acrylate copolymer is from about 0.3 to about 4.0, wherein the amount of said optional vinyl component units is from about 0 to about 20 parts by weight, wherein said optional vinyl component unit, before polymerization, is a vinyl ester having from 1 to 18 carbon atoms, styrene or a styrene derivative having a total of from 8 to 15 carbon atoms, vinylidene chloride, 1,2-dichloroethylene, vinyl naphthalene, a diolefin having a total of from 4 to 18 carbon atoms, or a monoolefin having a total from 2 to 18 carbon atoms.

3. A thermoplastic elastomer blend according to claim 2, wherein R¹ is hydrogen or an alkyl having from 2 to 10 carbon atoms, wherein R² is an alkyl having from 2 to 10 carbon atoms, an alkoxyalkyl, a phenoxyaryl, a phenoxyalkyl having from 2 to 18 carbon atoms, or combinations of alkoxyalkyl, phenoxyaryl, and phenoxyalkyl.

4. A thermoplastic elastomer blend according to claim 3, wherein the amount of said (a) vinyl chloride and said optional vinyl component units is from about 25 parts to about 80 parts by weight and wherein the amount of said (b) one or more acrylate units forming said polyvinyl chloride-acrylate copolymer is from about 75 parts to about 20 parts by weight, wherein the amount of said one or more conjugated dienes forming said nitrile rubber is from about 60 percent to about 85 percent by weight, and wherein the amount of said one or more acrylonitrile type monomers forming said nitrile rubber is from about 15 percent to about 40 percent by weight.

5. A thermoplastic elastomer blend according to claim 4, wherein the amount of said nitrile elastomer is from about 20 parts to about 300 parts by weight for every 100 parts by weight of said polyvinyl chloride-acrylate copolymer, and wherein $R^1$ is methyl or hydrogen.

6. A thermoplastic elastomer blend according to claim 5, wherein the inherent viscosity of said polyvinyl chloride-acrylate copolymer is from about 0.8 to about 2.0.

7. A thermoplastic elastomer blend according to claim 6, wherein said polyvinyl chloride-acrylate copolymer contains vinyl chloride and acrylate units wherein $R^1$ is hydrogen and $R^2$ is an alkyl or an alkoxyalkyl having from 2 to 8 carbon atoms, wherein the amount of said vinyl chloride units is from about 40 parts to about 60 parts by weight and wherein the amount of said one or more acrylate units is from about 60 parts to about 40 parts by weight, wherein said acrylonitrile type monomers is acrylonitrile, wherein the amount of said diene monomer forming said nitrile rubber is from about 60 percent by weight to about 75 percent by weight, and wherein the amount of said acrylonitrile monomer forming said nitrile rubber is from about 25 percent to about 40 percent by weight.

8. A thermoplastic elastomer blend according to claim 7, wherein the amount of said crosslinked nitrile elastomer is from about 30 parts to about 100 parts by weight for every 100 parts by weight of said polyvinyl chloride-acrylate copolymer, wherein the inherent viscosity of said polyvinyl chloride-acrylate copolymer is from about 1.0 to about 1.5, and wherein said diene monomer forming said nitrile elastomer is isoprene or butadiene.

9. A thermoplastic elastomer blend according to claim 8, wherein said polyvinyl chloride-acrylate copolymer contains vinyl chloride, 2-ethyl hexyl acrylate, ethyl acrylate, butyl acrylate units, or combinations of said acrylate units, and wherein said nitrile elastomer is made from acrylonitrile and butadiene monomers.

10. A thermoplastic elastomer blend according to claim 1, including blending said nitrile elastomer with said polyvinyl chloride-acrylate copolymer at a temperature of from about 20° C. to about 230° C.

11. A thermoplastic elastomer blend according to claim 4, including blending said nitrile elastomer with said polyvinyl chloride-acrylate copolymer at a temperature of from about 20° C. to about 230° C.

12. A thermoplastic elastomer blend according to claim 7, including blending said nitrile elastomer with said polyvinyl chloride-acrylate copolymer at a temperature of from about 35° C. to about 205° C.

13. A thermoplastic elastomer blend according to claim 8, including blending said nitrile elastomer with said polyvinyl chloride-acrylate copolymer at a temperature of from about 120° C. to about 175° C.

14. A thermoplastic elastomer blend according to claim 9, including blending said nitrile elastomer with said polyvinyl chloride-acrylate copolymer at a temperature of from about 120° C. to about 175° C.

* * * * *